(12) United States Patent
Florin et al.

(10) Patent No.: US 7,746,340 B2
(45) Date of Patent: Jun. 29, 2010

(54) METHOD AND APPARATUS FOR GENERATING A 2D IMAGE HAVING PIXELS CORRESPONDING TO VOXELS OF A 3D IMAGE

(75) Inventors: Charles Florin, Princeton, NJ (US); Romain Moreau-Gobard, Bangalore (IN); James P. Williams, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1121 days.

(21) Appl. No.: 11/398,210

(22) Filed: Apr. 4, 2006

(65) Prior Publication Data

US 2006/0251307 A1    Nov. 9, 2006

Related U.S. Application Data

(60) Provisional application No. 60/670,889, filed on Apr. 13, 2005.

(51) Int. Cl.
*G06T 15/00* (2006.01)
(52) U.S. Cl. .................. 345/420; 345/422; 382/103; 382/128; 382/154; 600/408; 600/452
(58) Field of Classification Search .......... 345/419, 345/420, 422; 382/103, 107, 128, 131, 154, 382/172, 280, 308; 600/408, 452
See application file for complete search history.

(56) References Cited

U.S. PATENT DOCUMENTS 5,560,360 A * 10/1996 Filler et al. ............... 600/408
7,120,290 B2 * 10/2006 Parker et al. ............. 382/154
7,209,779 B2 *  4/2007 Kaufman et al. .......... 600/425
7,295,693 B2 * 11/2007 Kaufman et al. .......... 382/131
7,486,812 B2 *  2/2009 Gurcan et al. ............ 382/131
2004/0252870 A1  12/2004 Reeves et al.
2005/0228250 A1  10/2005 Bitter et al.

OTHER PUBLICATIONS

Mora et al., Low Complexity Maximum Intensity Projection, ACM Transactions on Graphics, vol. 24, No. 4, Oct. 2005, pp. 1392-1416.*
Fishman et al., Volume Rendering versus Maximum Intensity Projection in CT Angiography: What works Best, When, and Why; Radio Graphics, May 2006, pp. 905-923.*
Krissian et al., Model Based Multiscale Detection of 3D Vessels; project INRIA, 2004, pp. 1-9.*
R. Marti, et al., "2D-3D Correspondence in Mammography," *School of Information Systems*, University of East Anglia, Norwich NR4 7TJ, UK.

* cited by examiner

*Primary Examiner*—Phu Nguyen

(57) ABSTRACT

Disclosed is a method and apparatus for generating a two dimensional (2D) image of a structure (e.g., an organ) that has at least one pixel corresponding to at least one voxel of a three dimensional (3D) image of the structure. First, the surface of the structure in the 3D image is modeled by a geometrical volume such as an ellipsoid. Next, normal maximum intensity projection (MIP) rays are cast (i.e., projected) for voxels of the geometrical volume. The 2D image is then generated using the rays. The 2D image has at least one pixel that corresponds to at least one voxel of the 3D image.

23 Claims, 6 Drawing Sheets

METHOD AND APPARATUS FOR GENERATING A 2D IMAGE HAVING PIXELS CORRESPONDING TO VOXELS OF A 3D IMAGE

This application claims the benefit of U.S. Provisional Application No. 60/670,889 filed Apr. 13, 2005, which is incorporated herein by reference.

BACKGROUND OF THE INVENTION

The present invention relates generally to medical imaging, and more particularly to generating a 2 dimensional (2D) image having pixels that correlate to voxels of a three dimensional (3D) image.

Cardiovascular diseases, such as heart disease and stroke, are one of the major causes of death in the U.S. To diagnose a cardiovascular disease, medical personnel may perform a Computed Tomography (CT) scan on a patient. A CT scan uses x-ray equipment to obtain image data from different angles around the human body and then processes the data to show a cross-section of the body tissues and organs. The image can then be analyzed by methods using morphological operators to highlight specific areas so that radiologists (or other medical personnel) can more easily diagnose problems such as cardiovascular diseases associated with the patient.

The CT scan typically provides high quality 3D images and image sequences of the patient's heart. These images often enable reproducible measurements of cardiac parameters, such as left ventricular volume, wall thickness, and parameters associated with the coronary arteries.

In recent decades, researchers have developed a wide variety of segmentation techniques for isolating coronary arteries (i.e., the blood vessels that supply blood and oxygen to the heart) from the rest of the CT scan. Coronary arteries are typically difficult to segment because of their size and proximity to the surface of the heart and blood pool.

Medical personnel often obtain and use a 3D image of the heart (or other organs of interest) in order to diagnose a patient. These medical personnel often also use a two dimensional (2D) representation of the organ to more clearly analyze particular portions of the organ. There remains a need, however, to correlate pixels of the 2D view with voxels of the 3D volume so that medical personnel can simultaneously use both representations to analyze the organ.

BRIEF SUMMARY OF THE INVENTION

In accordance with the present invention, a two dimensional (2D) image of a structure, such as an organ, is generated that has at least one pixel corresponding to at least one voxel of a three dimensional (3D) image of the structure.

The surface of the structure in the 3D image is modeled by a geometrical volume such as an ellipsoid. Next, normal maximum intensity projection (MIP) rays are cast (i.e., projected) for voxels of the geometrical volume. The 2D image is then generated using the rays. The 2D image has at least one pixel that corresponds to at least one voxel of the 3D image.

In one embodiment, a pixel of interest on the structure in the 2D image is selected (e.g., via a cursor). The 3D image is positioned to highlight a particular voxel corresponding to the selected pixel of the 2D image. This positioning can include, for example, scaling and/or rotating the structure in the 3D image.

The selecting of a particular pixel can also include the selecting of a ray. Further, the 3D image can be positioned in a manner that highlights a vessel or a region of interest that corresponds to the selected ray.

These and other advantages of the invention will be apparent to those of ordinary skill in the art by reference to the following detailed description and the accompanying drawings.

DETAILED DESCRIPTION

Figure 1:
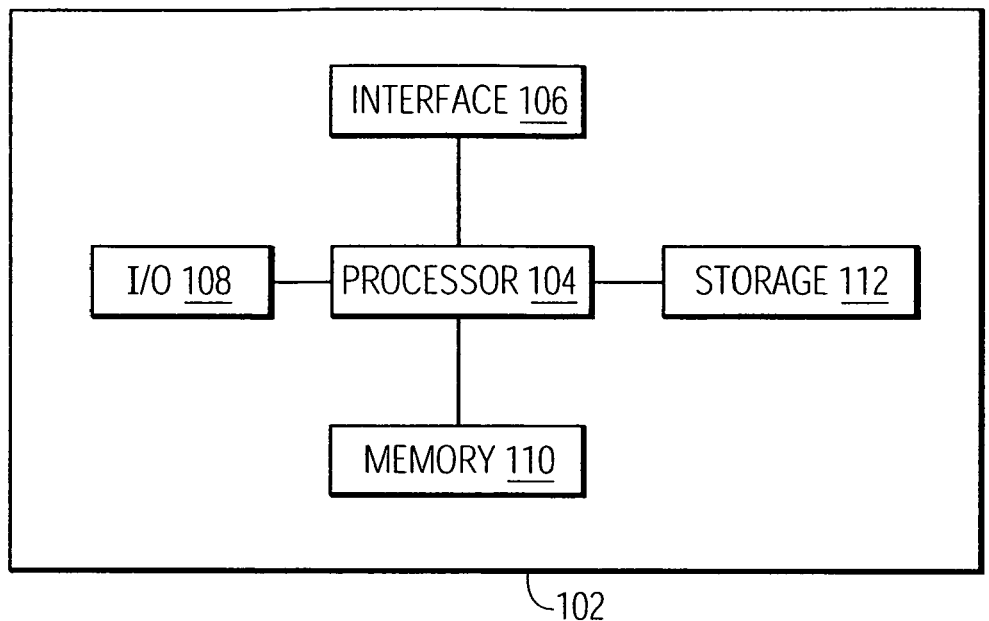
FIG. 1 is a high level block diagram of a computer in accordance with an embodiment of the invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 1. Computer 102 contains a processor 104 which controls the overall operation of computer 102 by executing computer program instructions which define such operation. The computer program instructions may be stored in a storage device 112 (e.g., magnetic disk) and loaded into memory 110 when execution of the computer program instructions is desired. Computer 102 also includes one or more interfaces 106 for communicating with other devices (e.g., locally or via a network). Computer 102 also includes input/output 108 which represents devices which allow for user interaction with the computer 102 (e.g., display, keyboard, mouse, speakers, buttons, etc.). One skilled in the art will recognize that an implementation of an actual computer will contain other components as well, and that FIG. 1 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine (e.g., a medical imaging machine).

Figure 2:
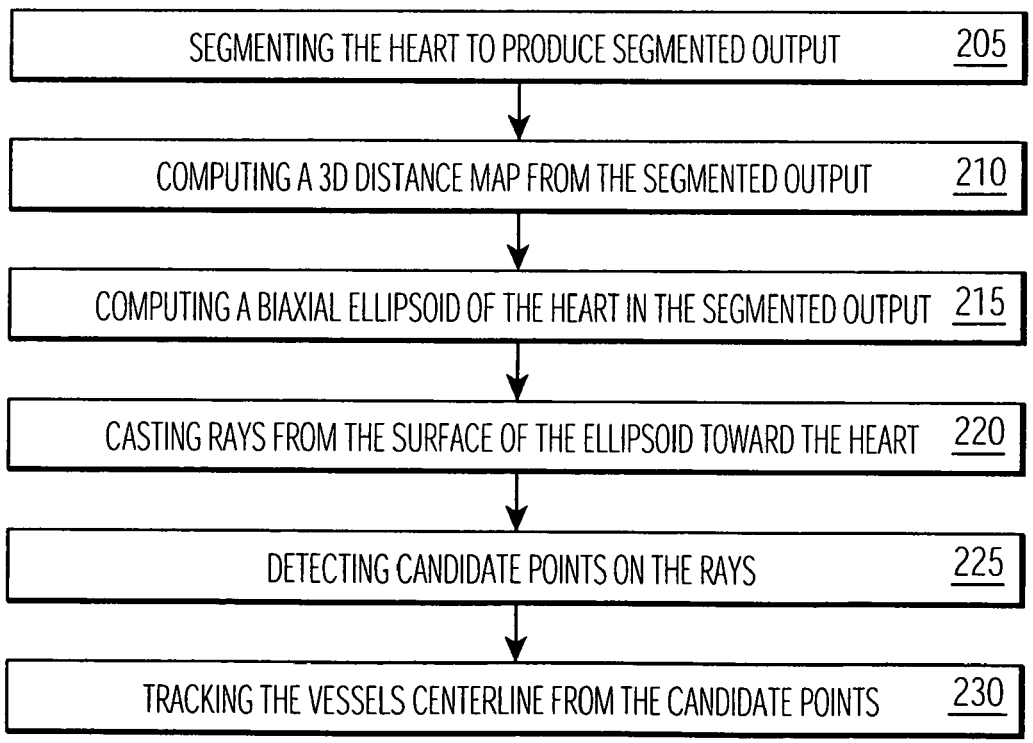
FIG. 2 shows a flow diagram of a method segmenting heart peripheral vessels in accordance with an embodiment of the invention.

Referring now to FIG. 2, a heart peripheral vessel segmentation method based on a ray filtering method is shown, as described in greater detail below, and in accordance with one exemplary embodiment of the present invention. In a step-by-step approach, the heart is first segmented (at step 205) using a method based on graph cuts and geodesic surfaces, for example. A 3D distance map is computed (at step 210) out of the segmentations output. A distance map is a volume that associates to each point the distance between this point and a reference (in our case, the heart's surface). Then, from this distance map, a biaxial ellipsoid modeling of the heart is computed (at step 215). Rays are cast (at step 220) from the surface of the ellipsoid toward the heart. This technique is described in U.S. patent application titled "Automatic Coronary Isolation Using A N-MIP Ray Casting Technique" having Ser. No. 10/983,921, which is incorporated herein by reference. Then, candidate points likely belonging to vessels are detected (at step 225) along the rays profiles.

In particular, a ray is casted from the surface of the geometric object (ellipsoid) toward the interior of the organ (heart). This ray crosses intensity voxels that are collected. For each ray, the collection of intensities is called a ray profile. On the 2D projection, each 2D pixel corresponds to a particular ray. The ray profile is averaged, and the mean intensity is associated with the 2D pixel.

The result of the steps of FIG. 2 is the generation of a 2D image. The image is generated by "unfolding" the heart displayed in the 3D image. This "unfolding" typically provides a better visualization technique of the heart coronaries and vessels on the surface of the heart compared to the 3D view of the heart. The unfolded 2D view of the heart typically enables a user to view the coronary arteries and heart peripheral vessels quickly. Further, because the 2D view is generated by "unfolding" the 3D view using ray casting, each voxel in the 3D view correlates to a single ray (and therefore pixel) in the 2D image. This correlation between the 2D and 3D images enables the displaying of a particular point or area of the heart in the 3D image as a result of the selection of a pixel in the 2D image. The technique used to generate a 2D image from a 3D representation of the heart is described in U.S. patent application titled "Heart Unfolding for Coronary Visualization" having Ser. No. 10/910,665, which is incorporated herein by reference.

We consider a segmentation method driven from a graph optimization technique with a shape constraint. The idea lying behind this segmentation is to minimize an energy function that is defined on a graph, according to the cut of minimum weight. The energy is written as the sum of two terms: $E_{smooth}(f)$ that imposes smoothness constraints on the segmentation mask (i.e., a binary volume, where the 0's denote the background (not the object) and the 1's denote the object of interest that has been segmented), and $E_{data}(f)$ measuring how the label f is adapted to the data:

$$E(f) = E_{smooth}(f) + E_{data}(f), \quad (1)$$

$$E_{smooth}(f) = \sum_{p,q \in neighbors} V_{p,q}(f(p), f(q)) \quad (2)$$

$$E_{data}(f) = \sum_{p \in P} D_p(f(p)) \quad (3)$$

$V_{p,q}$ in equation (2) is the interaction function between the pair of neighboring pixels $\{p, q\}$. $D_p$ in equation (3) measures how close the label f is to the pixel p intensity. Generally, such a method provides a global optimal solution for the case of binary valued f(p).

The heart segmentation method provided above is only exemplary. It should be appreciated that other methods for isolating the heart may be used, as contemplated by those skilled in the art, such as a model-based segmentation and segmentation methods based on level set methods.

The segmentation described above produces a 3D mask (i.e., pixels labeled object and background). As described above, a distance map is then created. A distance map from the surface of the 3D mask can provide valuable constraints during recovery of the peripheral vessels. For example, as the peripheral vessels remain parallel to the surface of the heart, their distance (i.e., distance of the vessels from the heart's surface) in the distance map varies smoothly.

The distance map is computed by parsing the 3D mask twice—once in one direction, and once in the other direction. Each voxel in the distance map is filtered on an edge (object-background) by a 3D chamfer mask, M, as is commonly known to those skilled in the art. The filtered voxels are used to model the heart by a geometrical object, such as an ellipsoid, to flatten its surface easily using cartography methods, as described in greater detail below.

Modelization of the Heart (or Any Other Organ) Shell by a Spheroid

The distance map is used to model the heart wall by an ellipsoid or a biaxial spheroid. In another embodiment, one may consider a more complex model such as a tri-axial ellipsoid.

The biaxial spheroid reduces the deformations potentially occurring if using a sphere. For a biaxial ellipsoid of semi-axes length a and b, the surface equation is $$\frac{x^2}{a^2} + \frac{y^2}{a^2} + \frac{x^2}{b^2} = 1 \quad (4)$$

or, in a parametric form: $x = a \cos(\lambda)\sin \Phi$, $y = a \sin(\lambda)\sin(\Phi)$, $z = b \cos(\Phi)$ where $\lambda \in [0, 2\pi]$ and $\Phi \in [0, \pi]$. Similar to what is commonly used in cartography, $\lambda$ and $\Phi$ are called longitude and latitude respectively. The ellipsoid center is computed as the center of gravity, G, of all the points located on the distance map isosurface 0 (the heart shell). The large axis Z is the vector $\overrightarrow{GM}$, where M is the point on the isosurface maximizing the length $|\overrightarrow{GM}|$. Similarly, the small axis X is the vector $\overrightarrow{GN}$, where N is the point on the isosurface minimizing the length $\|\overrightarrow{GN}\|$. The axis Y is deduced to have a direct orthogonal base, B=(G, X, Y, Z).

It should be noted that the quality of the modeling does not rely on the quality of the segmentation, which makes the method described herein independent from the selection of the segmentation method described above, and robust to noise. Moreover, the heart naturally has the shape of an ellipsoid. From the ellipsoid surface, rays are cast to compute a two-dimensional ("2D") view of the heart surface.

Ray Casting and N-MIP Projection

Figure 3A:
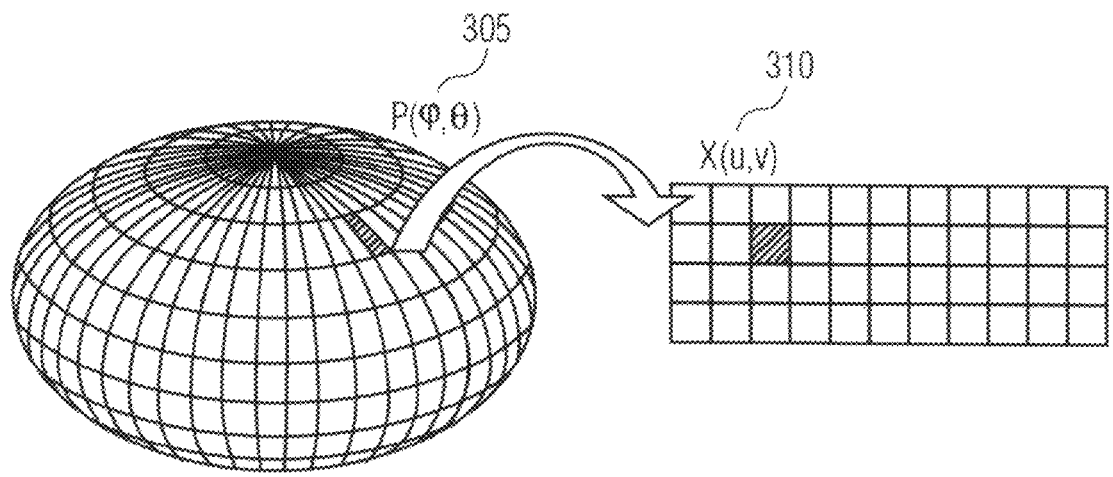
FIG. 3(a) shows an exemplary mapping of a point from 3D space to a point in 2D space in accordance with an embodiment of the invention.

Next, we cast rays from the ellipsoid, and collect the voxel intensities in a predefined direction and range inside and outside the heart wall. The distribution of the nodes on the ellipsoid used to cast rays is computed through the following transformation. Referring now to FIG. 3(a), for each point P($\phi$, $\theta$) 305 in a 3D-space (on an ellipsoid), the 2D-point X(u, v) 310 (on a plane) is computed according to:

$$[-\pi, \pi][-\pi/2, \pi/2] \to [0, w][0, H], (\lambda, \Phi) \to \left(u = \frac{W}{2\pi}\lambda, v = \frac{H}{\pi}\phi\right).$$

Figure 3B:
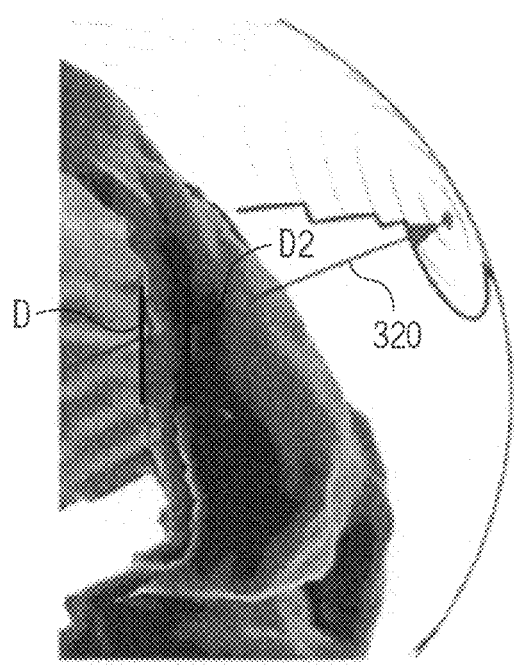
FIG. 3(b) shows an illustration of a ray during ray casting in accordance with an embodiment of the invention.

FIG. 3(b) shows an illustration of a ray 320 during ray casting. If rays are cast directly from the distance map itself, the rays would not be homogeneous enough to be exploitable. Indeed, because of the heart surface irregularities, such rays would miss many vessels. Another solution may be based on transverse Mercator projection for a biaxial ellipsoid. The drawback of such a method is that the volume has to be an ellipsoid of revolution, meaning the semi-minor axis is on the polar plane, and the semi-major axes are on the equatorial plane.

Figure 4:
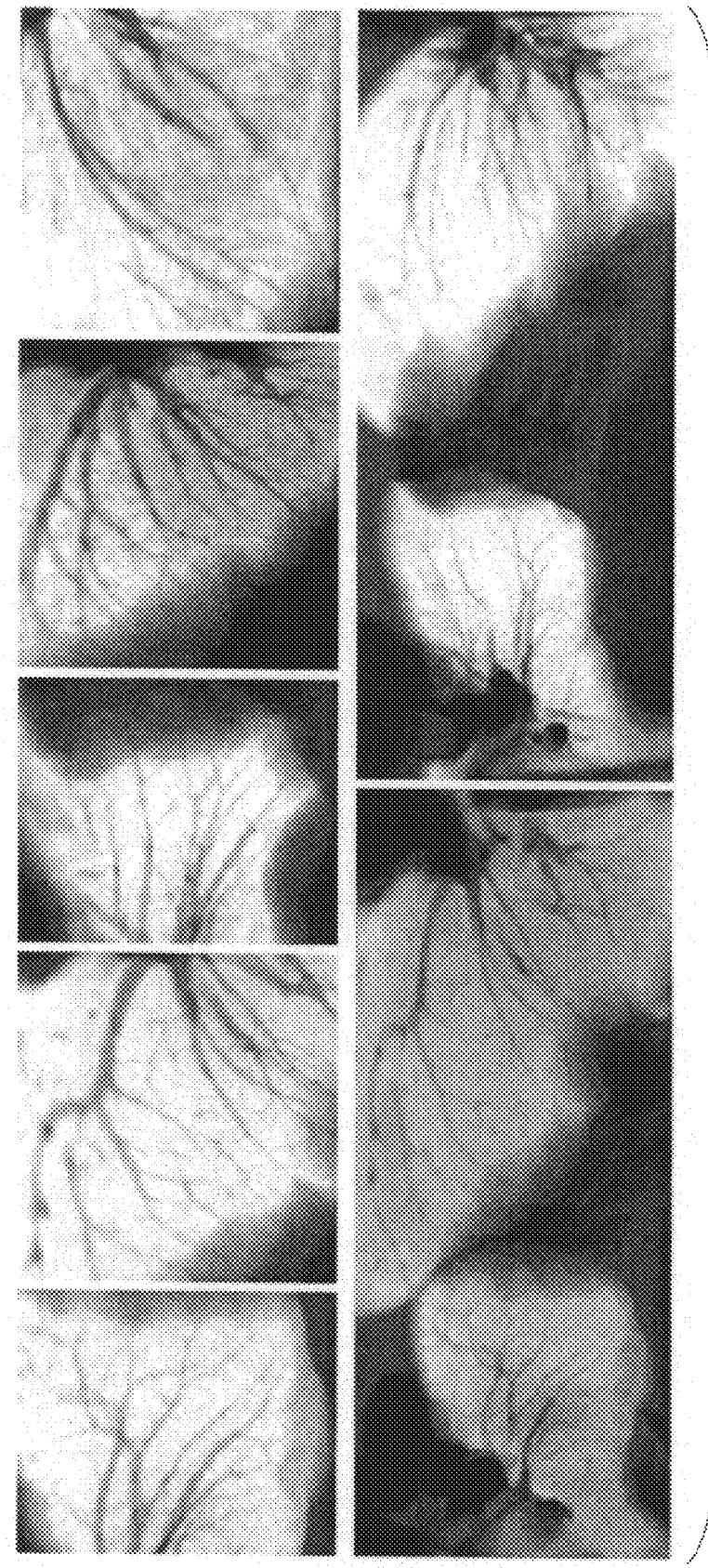
FIG. 4 shows unfolded n-MIP views of heart peripheral vessels for various patients in accordance with an embodiment of the invention.
Figure 5A:
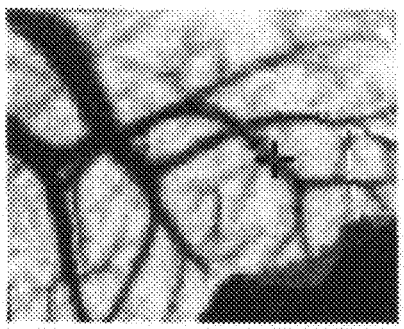
FIG. 5 shows profile curves at two different locations on the surface of the heart in accordance with an embodiment of the invention.
Figure 5A:
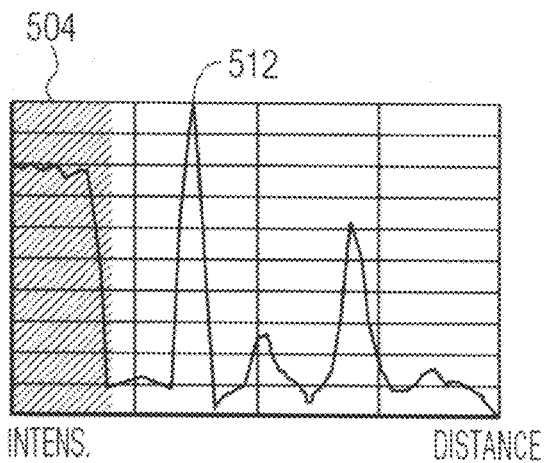
Figure 5B:
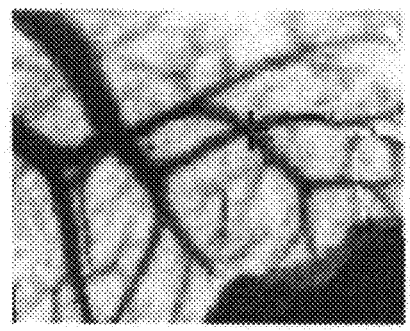
Figure 5B:
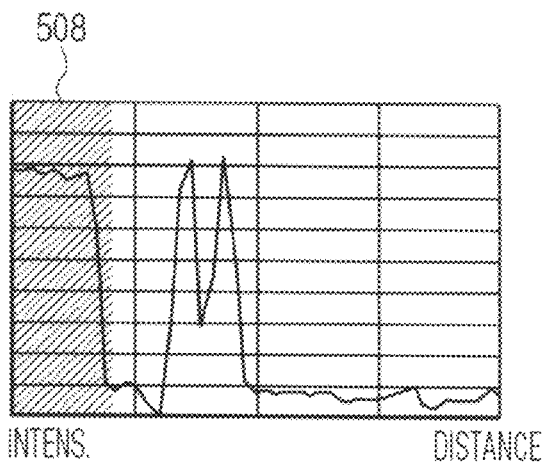
Figure 6A:
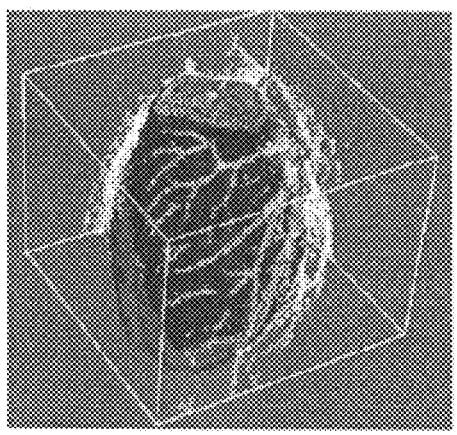
FIG. 6 shows exemplary vessel candidates in accordance with an embodiment of the invention.
Figure 6B:
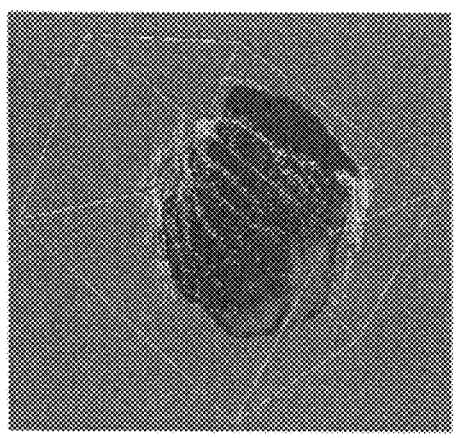
Figure 6C:
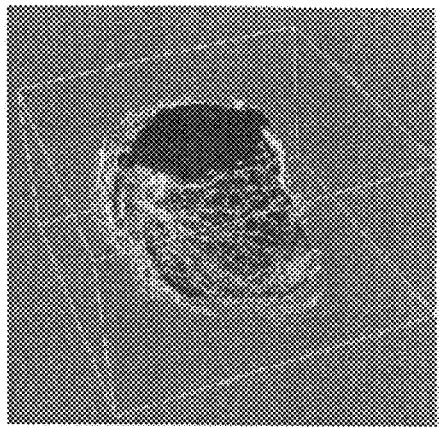
Figure 6D:
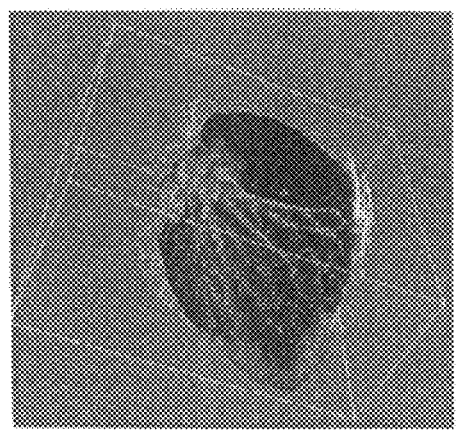
Figure 6E:
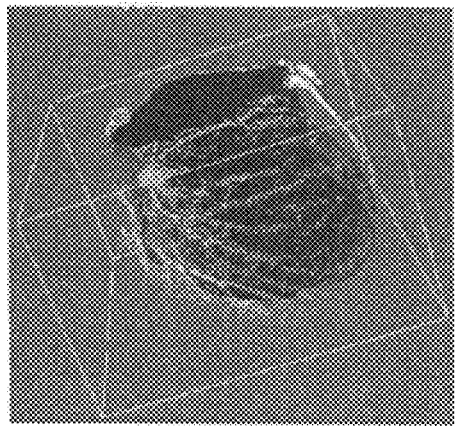
Figure 6F:
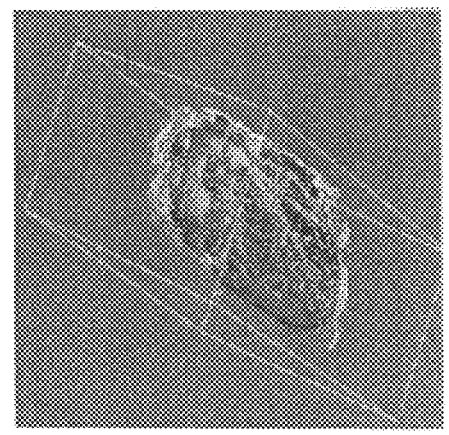

Referring now to FIG. 4, examples of unfolded n-MIP (i.e., normal maximum intensity projection) views of heart peripheral vessels for various patients are shown. As the intensities have been inverted for the views to look like angiograms, the coronary arteries appear darker as compared to the other heart components. Each pixel I(x, y) on the 2D view is the normalized sum of each intensity, $I_n$, of the ray $$I(x, y) = \frac{1}{N} \sum_{0<n<N+1} I_n \quad (5)$$

A profile matching technique is used to detect whether a ray crosses a vessel structure. Referring now to FIG. 5, a ray profile curve starts in the heart wall, which is represented as a large, flat, high intensity area. The x direction of the graph represents the depth of the ray, and the y direction represents the voxel intensity. FIG. 5 shows profile curves at two different locations on the surface of the heart. The myocardium area is indicated by crosshatching 504, 508. The vascular structures appear as peaks (e.g., peak 512) of high intensity, of limited diameter, and at a certain distance from the pericardium.

Next, peaks are processed to determine if they are suitable candidates for a vessel point, according to the following criteria:

1. A peak respects certain intensity properties (intensity value and peak shape)
2. A peak is within a certain distance from the heart wall.

The intensity peaks, added to the local maximum (a ridge detection), allow a fair detection of the vessels on the rays profile curve. To detect peaks, we use a zero-crossing of the Laplacian, with the following kernel: [−1 2 −1].

FIG. 6 displays, in 3D, the vessel points that are intersected by a ray, and detected using the procedure described above. FIG. 6 is relevant in coronary vessel segmentation. If the user selects (e.g., clicks on) one of these points in 3D, it can be displayed in 2D. Thus, upon completion of a procedure, the peaks detected on the rays are associated to 3D points.

Figure 7:
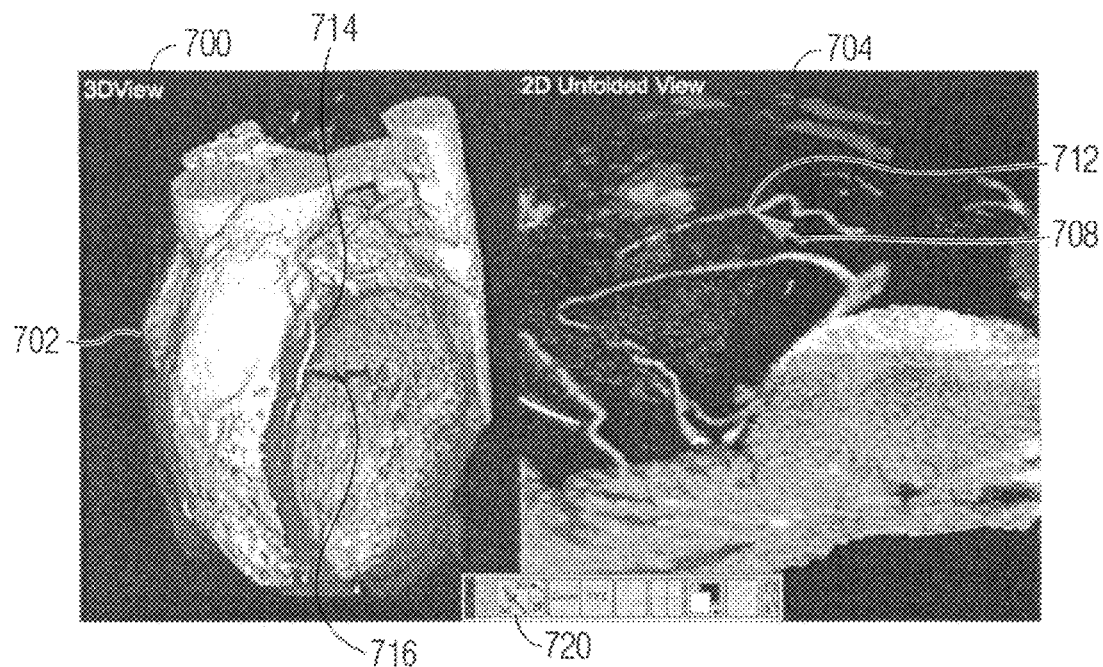
FIG. 7 shows a three dimensional (3D) view of a heart and a corresponding two dimensional (2D) view of the heart in accordance with an embodiment of the invention.

FIG. 7 shows a 3D image or view 700 of the heart 702 and a corresponding 2D image or view 704 of the heart that are displayed on a computer display, which may be part of I/O 108. As described above, the 2D view 704 is an unfolded view that is a collection of rays. These rays are rendered using normal-MIP so that they appear as a 2D image. As a result, for any given pixel in the 2D unfolded view 704, there is a corresponding voxel on the heart 702 in the 3D volume 700.

In one embodiment, the computer 102 enables the selection of a particular pixel of the 2D image. Specifically, a user of the computer 102 can position a cursor (e.g., via a mouse) to select a pixel in the 2D view 704. When this occurs, another cursor is automatically positioned at the corresponding voxel in the 3D view 700. When a point on the 2D image 704 is selected, the 3D heart volume 702 is rotated and/or scaled so that a selected ray appears parallel to the user's view. As a result, the user can review in the 3D view 700 the point or points that the user is analyzing in the 2D view 704.

In more detail, when a user clicks on a 2D pixel, the user is really selecting the full ray that is associated with this 2D pixel. The 3D volume is then rotated so that this ray appears parallel to the user's view (i.e., perpendicular to the computer screen).

For example, if a user uses cursor 708 to select a particular pixel 712 in the 2D view 704, the heart structure 702 is rotated and/or scaled so that the corresponding ray 714 is highlighted by a second cursor 716. In one embodiment, a user enables this correlation via a software button such as button 720.

In the 3D view 700, some occlusions may appear, due to tissues overlaying vessels. To check whether this occlusion refers to pathology or is instead a false positive, the correlation between a 3D voxel and a 2D point can be taken advantage of. In particular, a user selects a voxel of interest in the 3D view 700. As each voxel in the 3D view 700 corresponds to a particular pixel in the 2D image 704, the user can use the 2D view 704 to distinguish between a pathological vessel and a false positive.

Vessels may be detected using this algorithm. In one embodiment, the user selects a ray in the 2D view 704 and the heart 702 in the 3D view 700 is rotated and/or scaled to display the vessel that belongs to the ray. A marker may then be used in the 3D view 700 to underline the object of interest (e.g., the vessel).

Figure 8:
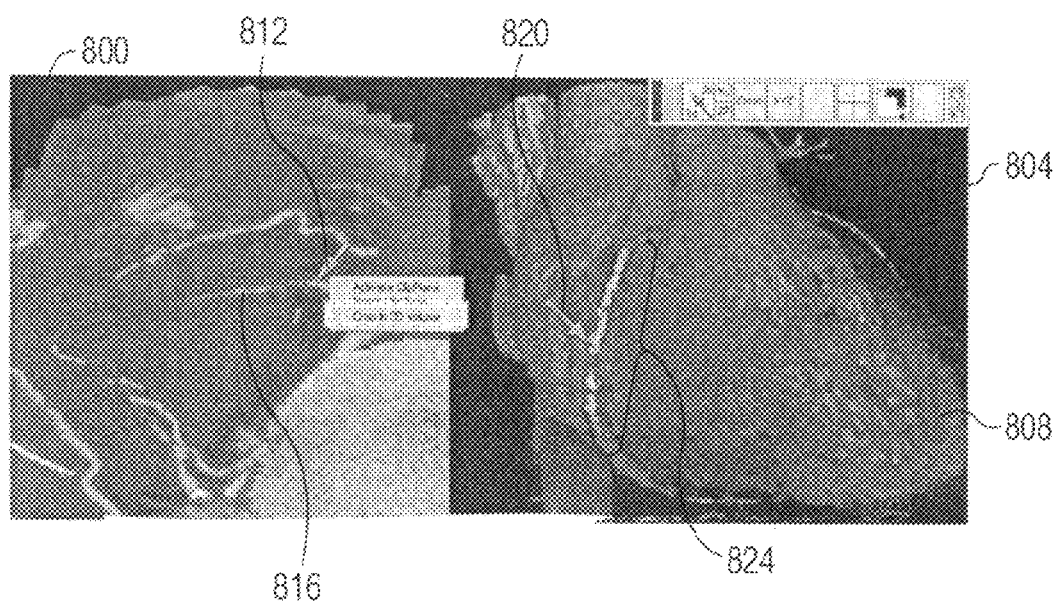
FIG. 8 shows another 3D view of a heart and a corresponding 2D view of the heart in accordance with an embodiment of the invention.

FIG. 8 shows a 2D view 800 of the heart and a corresponding 3D view 804 of the heart (also referred to below as volume) 808. A user can interactively draw on the 2D flattened surface 800 and define a region of interest in the 3D volume 808. For example, the user can use a cursor 812 to select a ray 816. Upon selection, the 3D heart 808 is rotated and a cursor 820 is used to highlight a region of interest 824 in the 3D heart 808. In another embodiment, a vessel is selected in the 3D volume 808 and the corresponding point or points in the 2D view 800 are highlighted.

Although the present invention is described above with respect to a heart, the description applies to any organ (e.g., stomach) or structure that can be enclosed by the geometric volume (e.g., ellipsoid).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating a two dimensional (2D) image of a surface of a structure having at least one pixel corresponding to at least one voxel of a three dimensional (3D) image of said structure comprising:

modeling at a computer a geometrical volume based on the surface of said structure in said 3D image;

projecting at the computer normal maximum intensity projection (MIP) rays for voxels of the geometrical volume toward an interior of the structure; and generating at the computer said 2D image having said at least one pixel corresponding to said at least one voxel of said 3D image using said MIP rays.

2. The method of claim 1 further comprising displaying at least one of said 3D image and said 2D image.

3. The method of claim 2 further comprising positioning said 3D image to highlight a particular voxel corresponding to a selected pixel of said 2D image.

4. The method of claim 3 wherein said positioning of said 3D image further comprises at least one of scaling said structure in said 3D image and rotating said structure in said 3D image.

5. The method of claim 1 further comprising enabling selection of a particular pixel of said 2D image.

6. The method of claim 5 wherein said enabling a selection of a particular pixel of said 2D image further comprises enabling a selection of a ray of said 2D image.

7. The method of claim 6 further comprising displaying said 3D image to highlight a vessel that corresponds to said ray.

8. The method of claim 6 further comprising displaying said 3D image to highlight a region of interest that corresponds to said ray.

9. A computer readable non-transitory storage medium comprising computer program instructions capable of being executed in a processor and defining the steps comprising:

modeling a geometrical volume based on a surface of a structure in a 3D image;

projecting normal maximum intensity projection (MIP) rays for voxels of said geometrical volume toward an interior of the structure; and generating a 2D image of the surface of the structure having at least one pixel corresponding to at least one voxel of said 3D image using said MIP rays.

10. The computer readable non-transitory storage medium of claim 9 further comprising computer program instructions defining the step of displaying said structure to highlight a particular voxel corresponding to a selected pixel of said 2D image.

11. The computer readable non-transitory storage medium of claim 10 wherein said step of displaying comprises at least one of scaling said 3D image and rotating said 3D image.

12. The computer readable non-transitory storage medium of claim 9 further comprising computer program instructions defining the step of enabling a selection of a particular pixel of said 2D image.

13. The computer readable non-transitory storage medium of claim 12 wherein said step of enabling a selection of a particular pixel of said 2D image further comprises enabling a selection of a ray of said 2D image.

14. The computer readable non-transitory storage medium of claim 13 wherein said step of enabling a selection of said ray of said 2D image further comprises displaying said 3D image in a manner to highlight a vessel that corresponds to said ray.

15. The computer readable non-transitory storage medium of claim 13 wherein said step of enabling a selection of said ray of said 2D image further comprises displaying said 3D image in a manner to highlight a region of interest that corresponds to said ray.

16. An apparatus for generating a two dimensional (2D) image of a surface of a structure having at least one pixel corresponding to at least one voxel of a three dimensional (3D) image of said structure comprising:

means for modeling a geometrical volume based on the surface of said structure in said 3D image;

means for projecting normal maximum intensity projection (MIP) rays for voxels of the geometrical volume toward an interior of the structure; and means for generating said 2D image having said at least one pixel corresponding to said at least one voxel of said 3D image using said MIP rays.

17. The apparatus of claim 16 further comprising means for displaying at least one of said 3D image and said 2D image.

18. The apparatus of claim 17 further comprising means for positioning said 3D image to highlight a particular voxel corresponding to a selected pixel of said 2D image.

19. The apparatus of claim 18 wherein said means for positioning of said 3D image further comprises at least one of means for scaling said structure in said 3D image and means for rotating said structure in said 3D image.

20. The apparatus of claim 16 further comprising means for enabling selection of a particular pixel of said 2D image.

21. The apparatus of claim 20 wherein said means for enabling a selection of a particular pixel of said 2D image further comprises means for enabling a selection of a ray of said 2D image.

22. The apparatus of claim 21 further comprising means for positioning said 3D image to highlight a vessel that corresponds to said ray.

23. The apparatus of claim 21 further comprising means for positioning said 3D image to highlight a region of interest that corresponds to said ray.

* * * * *